United States Patent

Takahashi

[15] 3,642,084
[45] Feb. 15, 1972

[54] INDEPENDENT FRONT SUSPENSION SYSTEM FOR A FRONT WHEEL DRIVE AUTOMOBILE

[72] Inventor: Mitsuo Takahashi, Ohta-shi, Gumma, Japan

[73] Assignee: Fuji Heavy Industries, Ltd., Tokyo, Japan

[22] Filed: June 26, 1969

[21] Appl. No.: 836,725

[52] U.S. Cl. ..........................................180/43 R, 280/96.2
[51] Int. Cl. ..........................................................B60k 17/30
[58] Field of Search .......................................180/42, 43, 48

[56] References Cited

UNITED STATES PATENTS

| 3,181,641 | 5/1965 | Haddad | 180/42 |
| 3,476,200 | 11/1969 | Schoepe et al. | 180/48 X |

FOREIGN PATENTS OR APPLICATIONS 150,690  11/1921  Great Britain..........................180/43

*Primary Examiner*—A. Harry Levy
*Attorney*—Sughrue, Rothwell, Mion, Zinn & Macpeak

[57] ABSTRACT

A front-wheel drive automobile has an axially nonextensible and noncontractable drive shaft connected at one end with the output shaft of a differential gear unit mounted on the vehicle body through an inboard universal joint and its other end with an axle of a wheel assembly through an outboard universal joint. A bearing housing rotatably supports the axle, a ball joint is provided on the bearing housing at a position beneath the axle and a post is connected at one end with the bearing housing ball joint and at the other end with a resilient member mounted on the vehicle body at a position rearward and inboard with respect to the ball joint and located at a position higher than that of the ball joint in the normal running state to provide a nosedown effect under vehicle acceleration.

2 Claims, 6 Drawing Figures

INVENTOR
MITSUO TAKAHASHI

INVENTOR
MITSUO TAKAHASHI

INDEPENDENT FRONT SUSPENSION SYSTEM FOR A FRONT WHEEL DRIVE AUTOMOBILE

BACKGROUND OF THE INVENTION

1. Field of the Invention

This invention relates to an independent front suspension system for a front-wheel drive automobile, and more particularly to such a front suspension system which is simple in construction and is less expensive to manufacture.

2. Description of the Prior Art

Front-wheel drives have prevailed in recent compact cars because they provide superior steering characteristics, stability, and utilize the limited space of the automobile to the maximum. A front-wheel drive of the automobile must be designed reasonably and carefully, particularly the arrangement of the parts of the front suspension and drive shaft, because these parts are complicated and generally more expensive than in conventional automobiles.

In a front-wheel drive automobile using an independent suspension system, a Hook's joint is generally preferred for the inboard joint in the viewpoint of cost, but it produces abnormal vibration due to the secondary couple and the lack of uniform transmission of speed where more than a certain angle, normally over 6°, is formed between the axes of the shafts coupled by the joint. In order to avoid the danger of collision between the bottom surface of the differential casing and road projections on which the vehicle runs, the bottom surface of the differential casing should have a predetermined clearance above the ground. Accordingly, the drive shaft extending from the inboard universal joint of a small car normally has an angle which is outwardly and down due to the diameter of the tire. Further, when the vehicle encounters a steep ascent or is accelerated under a fully opened throttle, the vehicle body will move up at the front side due to the ascending or accelerating resistance and the reaction of the large driving torque is such that the outside and down angle of the driving shaft becomes larger than that under normal operating condition. In addition, since the intensity of the aforementioned vibration is proportional to the driving torque, the joint angle under normal conditions must be small enough to compensate for the increment of the angle as previously described. This vibration may be prevented in two ways. One is to lower the position of the differential gear unit which is the conventional method. The other is to employ a uniform speed universal joint so as to prevent the vibration even though a larger joint angle is formed. The former has a disadvantage that the vehicle cannot run on an irregular road while the latter requires a higher cost for providing the same.

SUMMARY OF THE INVENTION

This invention eliminates the disadvantages of conventional front drive vehicles, and provides a new and improved front-wheel drive in which a simplified universal joint is used, and which simplifies the suspension arm and omits telescoping coupling of the driving shaft so as to reduce manufacturing costs.

The present invention provides a new and improved front suspension system which has a different arrangement of the suspension link. Simple less expensive Hook's joints are acceptable for inboard joints because the amount of noseup angle due to the large driving torque during the vehicle ascention or acceleration is decreased, and the clearance between the differential casing and the road is sufficient even for a small car having small diameter tires.

According to another aspect of the present invention, the conventional suspension system is simplified by adopting only one post which serves as a suspension arm for supporting the fore and aft load and by utilizing the driving shaft for supporting the lateral load.

A further aspect of the present invention provides a swinging half-axle which has no telescoping coupling which would normally tend to introduce difficulties due to the vibration, weight, lubrication, troubleshooting and maintenance and manufacturing cost. The drive shaft, being nonextensible and noncontractable in the axial direction, allows the supporting function of the lateral load to be achieved by the driving shaft instead of the suspension arm. Thus, the present invention provides simplicity in construction of the suspension system and is lightweight.

The present invention provides a front suspension system in which the functions of the lower suspension arm of conventional suspension system such as Wishbone type and Mcpherson type for supporting the lateral load and the longitudinal load, are divided so that the former is supported by the driving shaft while the latter is supported by one post, the driving shaft and the post being separately connected with the wheel bearing housing.

The present invention is principally described by way of an example which is applied to the front suspension system of Wishbone type in connection with the accompanying drawings.

DETAILED DESCRIPTION OF THE PREFERRED EMBODIMENTS

Figure 1:
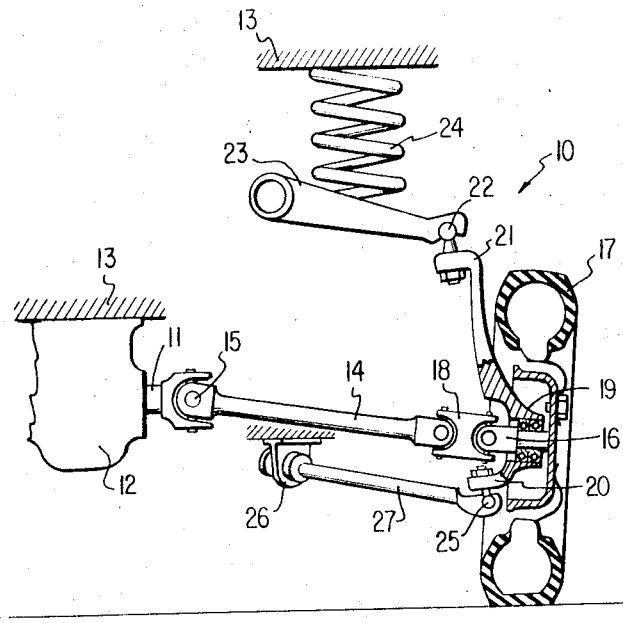
FIG. 1 is a front view of an example of a front suspension system of Wishbone type applied with an independent suspension system.
Figure 2:
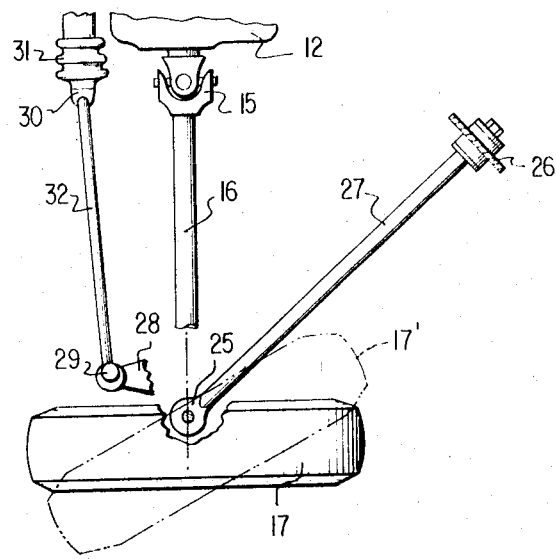
FIG. 2 is a plan view of the system of FIG. 1.
Figure 3:
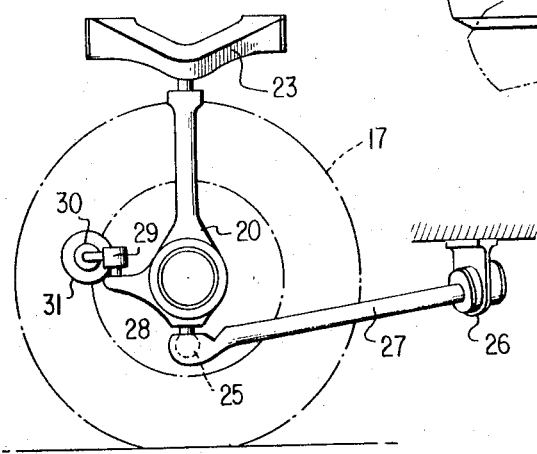
FIG. 3 is a side view thereof.

In FIGS. 1 to 3, a front suspension system of the Wishbone type is shown to which is applied an independent suspension system according to the present invention. The independent front suspension system 10 comprises an output shaft 11 extending from differential gear unit 12 mounted on a vehicle body 13. A driving shaft 14 transmits power from the engine (not shown) through output shaft 11 of differential 12, which shaft 14 does not telescope under axial load. An inboard universal joint 15 couples the output shaft 11 to driving shaft 14. Axle 16 of a wheel 17 carries outboard universal joint 18 for engaging the driving shaft 14 to the axle. Bearings 19 are located in a bearing housing 20 for rotatably supporting the axle 16. The bearing housing 20 has a projection 21 projecting upwards therefrom, an upper ball joint 22 connects an upper arm 23 with the projection 21 of the bearing housing 20. A spring 24 is connected at one end with the upper arm 23 and at the other end with the vehicle body 13 for resiliently securing the upper arm 23 in such a manner that the upper arm 23 may rock about an axis parallel to the longitudinal axial direction of the vehicle body for buffering the upward movement of the wheel 17. A lower ball joint 25 is provided on the bearing housing 20 beneath the axle 16. A rubber mounting 26 is provided on the vehicle body or a power unit casing at a position rearward and inboard with respect to the lower ball joint 25. A post 27 is connected at one end with the lower ball joint 25 and at its other end to the rubber mounting 26 so as to extend from the lower ball joint 25 rearward and inboard of the vehicle body. An arm 28 is provided on the bearing housing 20 and projects substantially horizontally and forwardly therefrom. A ball joint 29 is mounted on the arm 28. A ball joint 30 connects steering gear mechanism 31 to a tie rod 32 which is in turn connected at the other end with the arm 28 through the ball joint 29.

Inasmuch as the driving shaft 14 is so constructed as not to telescope as previously described, it functions to determine the position of the wheel 17 in the lateral direction. Wheel camber is determined in such a manner that the ball joint 22 mounted on the upper arm 23 and the outboard universal joint 18 determines the disposition of the bearing housing 20 in the lateral direction.

The post 27 is mounted on the rubber mounting 26 at a position rearward of the center of the wheel 17 and at the same time, higher than the ball joint 25 under normal running conditions of the vehicle and the rubber mounting 26 is located inboard of the vehicle enough with respect to the position of the ball joint 25 that the post 27 will not interfere with the wheel 17 during steering. Thus, the position of the lower end of the bearing housing 20 is determined by the post 27 in the longitudinal direction of the vehicle.

Figure 4:
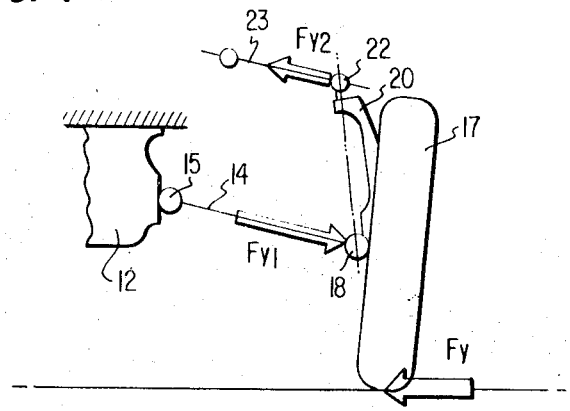
FIG. 4 is a partial schematic front view of a wheel in the state when a lateral load is applied to the contact point between the wheel and the ground.

FIG. 4 shows the condition of the wheel 17 when a lateral load is applied to the contact point between the wheel and the ground; that is, the aspect of the reaction produced by virtue of the lateral load is applied to the contact point between the wheel 17 and the ground. Thus, the driving shaft 14 acts as a suspension arm against the lateral load, and accordingly, post 17 suffices to support only the longitudinal load so that it is subjected merely to longitudinal compression, and the tension. This results in a structure which may be extremely simplified in comparison with conventional lower arms. Further, since the driving shaft 14 has no expensive telescoping coupling, the manufacturing cost is less expensive.

Figure 5:
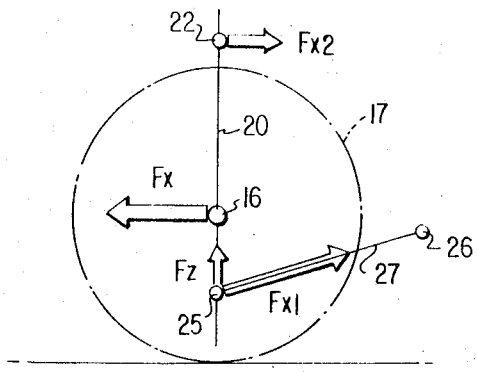
FIG. 5 is a side view of the wheel in FIG. 4, with a driving force applied to the wheel center.

FIG. 5 shows the condition of the wheel when a driving force $Fx$ is applied to the center of the wheel with respect to the ground, that is, the aspect of the reaction in post 27 as well as in the ball joint 22 resulting from the driving force $Fx$ applied to the center of the wheel 17. Inasmuch as the post 27 exerts a force which tends to lower at the front, i.e., an upwardly directed component force $Fz$, by virtue of the driving force $Fx$ whereby the spring 24 is compressed to prevent the vehicle body from being raised at the front when the vehicle is accelerated or it is ascended to cause the engine driving force to be increased. The outside down angle with respect to the horizontal of the driving shaft 14 extending from the inboard universal joint 15 is reduced to a small value in comparison with the conventional ones due to the arrangement as previously described, thus the expensive uniform speed universal joint can be eliminated.

In order to eliminate the aforementioned noseup effect of the vehicle body due to the driving force, a conventional suspension system having antidive effect when the brakes are applied may be used. In this case, however, a change in the caster of the wheel will take place when the wheel moves up and down, and this is not preferably due to its effect on the steering operation.

The ball joint 25 mounted on the end of the post 27 of the present invention may be considered to move along a circular orbit in a vertical plane perpendicular to a line joining the center of the universal joint 15 and the center of the rubber mounting 26 with the center of the orbit located in the line. This centerline is disposed considerably nearer the center of the vehicle with the result that it is substantially parallel to the longitudinal axis of the vehicle. Thus, the movement of the ball joint 25 can be made substantially straight as seen from the side of the vehicle by suitably selecting the mounting height of the universal joint 15 and the rubber mounting 26, and the change in caster can be prevented. Further, the degree of prevention of noseup of the vehicle due to the driving force can also be varied to a suitable value by changing the vertical disposition of the ball joint 25 connected to the end of post 27.

Figure 6:
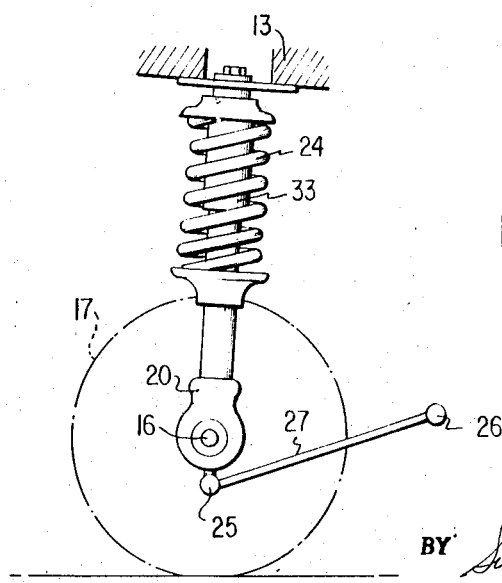
FIG. 6 is a side view of another example of the present invention as applied to an independent front suspension system of a front drive vehicle.

Although the aforementioned description is made in connection with a suspension system of the Wishbone type, it should be understood from the foregoing description that the same effect may be similarly expected in other suspension systems such as the Mcpherson type, as shown in FIG. 6. The suspension system shown in FIG. 6 comprises a cylindrical damper strut 33 in place of the upper arm 23 shown in FIGS. 1 to 3, but the other components including the driving shaft, and the post, as well as the operation thereof being similar to those shown in FIGS. 1 to 3.

What is claimed is:
1. In an independent front suspension system for a front-wheel drive automobile, a differential gear unit mounted on the vehicle body and including an output shaft, a driving shaft which is nonextensible and noncontractable for transmitting power from the engine through said output shaft of the differential, and inboard universal joint connecting the output shaft to the driving shaft, an outboard universal joint connecting the driving shaft to the vehicle wheel axle, a bearing housing rotatably supporting said axle, an upper arm coupled to said bearing housing and to said vehicle body for pivoting about a longitudinal axis, and spring-loaded shock-absorbing means coupled to said upper arm and said vehicle body for buffering the up and down movement of the wheel relative to the vehicle body, the improvement comprising: a lower ball joint provided on said bearing housing and lying beneath said axle, mounting means on said vehicle body at a position rearward of said lower ball joint, a post connected at one end to the lower ball joint and at the other end with said mounting means to define a single fore and aft load suspension arm for the independent front suspension system, and steering gear means connected to said bearing housing for steering said wheel, said mounting means being positioned inboard of, and higher than said lower ball joint when said vehicle is moving at a nonaccelerated rate whereby said post extends in a down and outward position and is prevented from interferring with said wheel when the same is steered to a maximum angle from a longitudinal parallel position to said vehicle body.

2. The independent front suspension system as claimed in claim 1, wherein said bearing housing includes a generally vertically upright projection, said upper arm extends outwardly of said vehicle body towards said wheel, a ball joint couples the outboard end of said pivotable upper arm to said projection and said shock-absorbing means comprises a vertically oriented coil spring positioned intermediate of said vehicle body and said arm and between the pivot axis of said upper arm and said ball joint, and said steering gear means includes a tie rod having its outboard end connected through a ball joint to said bearing housing at a point on said bearing housing circumferentially spaced 90° from said lower ball joint and said vertically upright bearing housing projection.

* * * * *